(12) United States Patent
Nikodem et al.

(10) Patent No.: US 9,948,074 B2
(45) Date of Patent: Apr. 17, 2018

(54) CIRCUIT BREAKER ARRANGEMENT

(71) Applicant: SCHNEIDER ELECTRIC INDUSTRIES SAS, Rueil Malmaison (FR)

(72) Inventors: Robert Nikodem, Varces (FR); Jianjiang Fu, Shanghai (CN); Shouqing Liu, Beijing (CN); Ming Fang, Xi'An (CN); Liang Sun, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 78 days.

(21) Appl. No.: 15/027,835

(22) PCT Filed: Oct. 10, 2014

(86) PCT No.: PCT/EP2014/071805
§ 371 (c)(1),
(2) Date: Apr. 7, 2016

(87) PCT Pub. No.: WO2015/052328
PCT Pub. Date: Apr. 16, 2015

(65) Prior Publication Data
US 2016/0261096 A1 Sep. 8, 2016

(30) Foreign Application Priority Data

Oct. 10, 2013 (CN) .......................... 2013 1 0470308
Oct. 10, 2013 (CN) .......................... 2013 1 0470776
Oct. 10, 2013 (CN) .......................... 2013 1 0470778

(51) Int. Cl.
*H01H 9/20* (2006.01)
*H02B 11/133* (2006.01)
*H02B 11/127* (2006.01)

(52) U.S. Cl.
CPC ......... *H02B 11/133* (2013.01); *H02B 11/127* (2013.01)

(58) Field of Classification Search
CPC ........................... H02B 11/133; H02B 11/127
(Continued)

(56) References Cited

U.S. PATENT DOCUMENTS 6,777,627 B1  8/2004  Stevenson
6,951,990 B1  10/2005  Miller
(Continued)

FOREIGN PATENT DOCUMENTS

CN       201130646 Y    10/2008
CN       201178260 Y    1/2009
(Continued)

OTHER PUBLICATIONS

Second Office Action dated Dec. 28, 2016 received in Chinese Patent Application No. 201310470308.8, 6 pages.
(Continued)

*Primary Examiner* — Edwin A. Leon
*Assistant Examiner* — Lheiren Mae A Caroc
(74) *Attorney, Agent, or Firm* — Locke Lord LLP

(57) ABSTRACT

A circuit breaker arrangement is disclosed. It comprises a cart (1) on which slides a circuit breaker. A lead screw (14) drives the circuit breaker along a linear path by moving a drive block (15), an upper protuberance (211) of which engages the circuit breaker. The arrangement provides for an automatic uncoupling of the circuit breaker at an end position of the drive block (15), where a handle inserted into a hole (24) may turn an end of the lead screw and rock the drive block with a meshing mechanism (43) so that the protuberance (211) escapes the circuit breaker. It is therefore very easy to mount, dismount or replace the circuit breaker. A similar advantage based on unlatching an interlock may be (Continued)

obtained for dismounting the electrical motor (12) that normally drives the lead screw (14). The invention can well take place in the medium voltage industry.

14 Claims, 10 Drawing Sheets

(58) Field of Classification Search
USPC ............ 361/600, 606–609; 200/50.21–50.27
See application file for complete search history.

(56) References Cited

U.S. PATENT DOCUMENTS

| | | | | |
|---|---|---|---|---|
| 7,057,123 | B1* | 6/2006 | Jenkins | H02B 11/133 200/50.23 |
| 2011/0147173 | A1* | 6/2011 | Lee | H02B 11/127 200/50.25 |
| 2012/0085628 | A1 | 4/2012 | Pearce et al. | |
| 2012/0199450 | A1 | 8/2012 | Bower et al. | |

FOREIGN PATENT DOCUMENTS

| | | | |
|---|---|---|---|
| CN | 101908736 | A | 12/2010 |
| CN | 102361243 | A | 2/2012 |
| CN | 202308875 | U | 7/2012 |
| CN | 102123676 | A | 10/2012 |
| EP | 2339603 | A2 | 6/2011 |
| JP | H10-271614 | | 10/1998 |
| JP | 3616370 | | 2/2005 |
| JP | 2013150375 | | 8/2013 |

OTHER PUBLICATIONS

English Language Translation of Second Office Action dated Dec. 28, 2016 received in Chinese Patent Application No. 201310470308.8, 4 pages.
English Language Abstract of Chinese Patent Application Publication No. CN201130646Y—1 page.
English Language Machine Translation of Chinese Patent Application Publication No. CN201130646Y—6 pages.
English Language Abstract of Chinese Patent Application Publication No. CN201178260Y—1 page.
English Language Machine Translation of Chinese Patent Application Publication No. CN201178260Y—12 pages.
English Language Abstract of Chinese Patent Application Publication No. CN101908736A—1 page.
English Language Machine Translation of Chinese Patent Application Publication No. CN101908736A—5 pages.
English Language Abstract of Chinese Patent Application Publication No. CN102723676A—1 page.
English Language Machine Translation of Chinese Patent Application Publication No. CN102723676A—15 pages.
English Language Abstract of Chinese Patent Application Publication No. CN102361243A—1 page.
English Language Machine Translation of Chinese Patent Application Publication No. CN102361243A—10 pages.
Chinese Office Action for Chinese Patent Application No. 201310470778.4, dated May 3, 2016, 7 pages.
English Language Translation of Chinese Office Action for Chinese Patent Application No. 201310470778.4, dated May 3, 2016, 5 pages.
English Language Abstract for Japanese Patent Application Publication No. JPH10-271614, published Oct. 9, 1998, 1 page.
English Language Abstract for Japanese Patent Application Publication No. JP3616370, published Feb. 2, 2005, 1 page.
Korean Office Action dated Mar. 7, 2017 for Korean Patent Application No. 10-2016-7009440, 4 pages.
English Language Translation of Korean Office Action dated Mar. 7, 2017 for Korean Patent Application No. 10-2016-7009440, 4 pages.
English Language Machine Translation of Chinese Patent Application Publication No. CN202308875U, dated Jul. 4, 2012, 2 pages.
EP Communication dated Aug. 21, 2017 for European Patent Application No. 14784045.8, 6 pages.
English Language Machine Translation of Japanese Patent Application Publication No. JP2013150375, 16 pages.
International Search Report for International Application No. PCT/EP2014/071805, dated Mar. 24, 2015, 5 pages.

* cited by examiner

CIRCUIT BREAKER ARRANGEMENT

BACKGROUND

The present invention relates to a circuit breaker arrangement.

In the current medium voltage industry, the central removable switch cabinet plays a predominate role, and the primary characteristic thereof is that the circuit breaker can be separated from the switch cabinet. Based on the position of the circuit breaker within the switch cabinet, there are three different states: operating position, intermediate position and testing position. When the circuit breaker is at the operating position, the circuit breaker can be coupled with the main circuit of the switch cabinet; and when the circuit breaker is at the testing position, the circuit breaker maintains an isolation state from the main circuit of the switch cabinet. Wherein, the circuit breaker can only be drawn out from the switch cabinet when being in the testing position.

The movement of the circuit breaker can be achieved by a carrying cart. The existing carrying carts for the circuit breaker are mostly mounted onto the circuit breaker as an auxiliary for the circuit breaker. Such a conventional cart for the circuit breaker has become the only choice for most of the domestic switch cabinet companies. However, the existing carts for the circuit breaker present much problem as follows:

The cart and the circuit breaker are coupled into one entirety through bolt fastening, so that the circuit breaker and the cart wholly have a greater volume, are cumbersome, and the weight thereof is at least 15 kg, resulting in a higher package and transportation cost.

It has too little functions, lacks positional mechanical indication, has no emergency braking button and linkage dispersing, and the linkage for the low voltage plug is mounted on the switch cabinet. In addition, the existing cart also has no padlock and key lock.

In the swaying in/out process of the cart, the circuit breaker would be rocked, causing damage to the lead-screw.

The switching mechanism for the position switch is complicated, and the switching is unreliable.

The circuit breaker is swayable in/out when the door of the switch cabinet is in an open state, and the door can be opened when the circuit breaker is at intermediate position, which causing low safety.

The electrical arrangement is complicated to be implemented.

And according to a further aspect of the invention, an increasing number of medium-voltage switch cabinets requires electrodynamic mechanism, the operating position and isolated location of the circuit breaker accommodated in the cabinet is needed to have the ability of automatic switchover. Due to the possibility of the electrical motor occurring failure, it's necessary for the electrical motor to be able to facilitate assembly and disassembly, and at the same time, when manual operation is required, the electrical motor needs to be powered off. In the medium-voltage switch cabinet, the electrical motor driver mechanism, which drives the circuit breaker through the cart, generally moves along with the circuit breaker, and the electrical motor driver mechanism is commonly coupled with the drive lead screw of the cart via rack-and-gear. As such, additional 4 to 5 gears as well as chains would be added, and the transmission efficiency is lower, the adding of the chains also increases greatly the risk of failure. The cost is also increased. Using such a way that the electrical motor driver mechanism is cooperated with the drive lead screw of the cart, the circuit breaker will have to lifted by a crane when failure occurs for the electrical motor, the chassis, i.e., the aforementioned cart, is disassembled from the circuit breaker, then a screwdriver is used to unload the screw of the electrical motor and a new electrical motor is transferred to replace the used one, and the screwdriver is again used to fix the electrical motor onto the cart, then the cart is mounted to the circuit breaker.

It can be appreciated that such a manner, in which the electrical motor driving mechanism is coupled with the drive lead screw of the cart, makes it difficult to replace the inactive electrical motor, to perform assembly and maintenance, and further, the use of additional gears and chains would increase the manufacturing cost.

Thus, a drawback of conventional circuit breaker arrangements is that some heavy and cumbersome components are difficult to dismount and mount again on the cart of the cabinet, although this may become necessary for repair or replacement. The general purpose of this invention is to make easier the mounting and dismounting of these components with a modular construction of the circuit breaker arrangement.

According to a general definition, the invention relates to a circuit breaker arrangement, comprising:
  a circuit breaker;
  a cart on which the circuit breaker slides, the cart comprising a lead screw and a circuit breaker drive block, said drive block being threaded on the lead screw and driving the circuit breaker;
  an electrical motor that rotates the lead screw;
  characterized in that the circuit breaker and/or the electrical motor are mounted on the cart through connections consisting of interlocked parts, a latch for engaging one of the interlocked parts and maintaining said interlocked parts in an interlocked state, and a mechanism for releasing the latch.

The connection between the cart and the separable modules comprising the circuit breaker and/or the electrical motor is based on an interlock of mating parts. The interlock can be made easily, by simple approach movements of the mating parts. When it is made, a right positioning of the modules on the cart is ensured. The latch safely maintains the interlock afterwards, until the mechanism is actuated. No complicated operations like installing and screwing bolts, or assembling the loose parts of a power transmission mechanism, are present in the invention.

When the invention is embodied for the circuit breaker module, the interlocked parts favorably comprise a protuberance on the drive block and an aperture in a floor of the circuit breaker, the protuberance entering the aperture in the interlocked state. The interlock can be made or interrupted by a mere movement of the protuberance, which may result from a rotation of the drive block. The circuit breaker module remains free on the cart when the interlock is interrupted and it may be removed by sliding on the cart upper surface. No particular accuracy is required from the operators.

Further, the latch may comprise static means provided on the cart for impeding a rotation of the drive block. Static means are likely to be safe and durable. An example consists in edges of an elongated slot parallel to the lead screw, said edges being adjacent to the protuberance, the elongate slot extending along a stroke of the drive block along the lead screw except at a disconnecting position for the circuit breaker. The disconnection of the circuit breaker module is possible only at a single position of the circuit breaker then, which could correspond to the testing position, and a safe connection of the module is ensured at the other positions, especially the operating positions.

The mechanism for releasing the latch may consist in means for rotating the drive block. This mechanism may depend on a handle normally not present on the apparatus, so that the unlatching only occurs with a voluntary action. It may be actuated by a particular rotation of the lead screw, either with the separate handle or with the electrical motor. In either case the unlatching occurs only when a determined position of the drive block is reached, which imposes a voluntary action anyway. In particular embodiments of the invention, this means comprises meshing elements provided on the drive block and on a support rotating with the lead screw. It may further comprise a guiding sleeve slidably and rotatably retained in a plate of the cart, a spring for biasing the sleeve at a set angular position and at a distance of the support, and the guiding sleeve comprises meshing elements which mesh with the elements of the drive block and of the support.

Also, the cart may comprise a front panel, which is provided with a handle inserting hole registering with a free end of the lead screw. The front panel may carry various knobs, warning lights, etc. for a convenient and elaborate operation of the apparatus. However, the handle inserting hole provides for the mentioned voluntary unlatching operation. This hole may remain obstructed during the normal operation of the apparatus.

When the invention is embodied on the electrical motor, the interlocked parts may comprise at least one pin and one mating pilot hole, the pin and the pilot hole being provided on a mounting first plate of the electric motor and on a second mounting plate provided on the cart. A better positioning is obtained with two pilot holes and two pins. This interlock is particularly easy to establish and to interrupt, with straightforward movements of the motor module.

In a particular embodiment, the second mounting plate is elbow-shaped, and the lead screw is provided with a third mounting plate, the third mounting plate being fixed to an upper side of the second mounting plate and the first mounting plate standing opposite another, vertical side of the second mounting plate. Such a construction facilitates an automatic coupling of the motor output shaft to the lead screw when the motor module is mounted to the cart. The coupling may include the engagement of a key (having a non-circular cross-section) into a mating keyway. A clutch may be present between the motor and the lead screw.

In such embodiments, the latch may simply comprise a mobile plate connected to a part in which the pilot holes are provided, and penetrating in grooves of the register pins, and the mechanism for releasing the latch may then comprise comprises a fourth mounting plate, and a pin provided on the fourth mounting plate and about which the mobile plate rotates.

In favorable embodiments of the apparatus, there is provided a swayable in/out driver mechanism for the circuit breaker, the driver mechanism comprises: a cart body which is fixed to the switch cabinet and does not move along with the circuit breaker in the switch cabinet; a lead-screw mounted onto the cart body by means of a lead screw anchor support and being only rotatable, wherein the lead-screw can be directly driven with a handle or electrical motor; a circuit breaker driver block engaged with the lead-screw, which moves forward and backward along the lead-screw under the rotation of the lead-screw, so as to bring the circuit breaker to switch between the operating position and the testing position, wherein when the circuit breaker is at the testing position, the connection or separation between the driver block and the circuit breaker can be achieved.

The driver mechanism further comprises: a front panel for the cart, which panel can protrude from the door of the switch cabinet so as to operate the circuit breaker and also comprises the functions of information indication and linkage.

The front panel for the cart comprises an emergency braking button, a padlock, a key lock, an insertion aperture for handle operation, an indicating device for the position of the circuit breaker and an indicating device for linkage state.

The emergency braking button comprises the following functions: (1) emergency braking, (2) improper operation proofing, and (3) mechanical and electrical block, and the emergency braking button has striking colors, and when the door is closed, operators perform operations to the emergency braking button through the pushing, moving and releasing operations.

The driver mechanism further comprises a handle slide for achieving the function where the circuit breaker can only be swayed in/out when the door is closed.

The driver mechanism also comprises a key lock, so that, only on occasions that it's unlocked in advance, could the handle slide be slid.

The driver mechanism can also control the driving operation through low voltage plug linkage, such that, when no low voltage plug is inserted, the cart can not be swayed.

The driver mechanism further comprise a gain on the door linking plate, so that when the circuit breaker is at the intermediate position, the gain on the door linking plate locks the stop pin on the door of the switch cabinet.

The driver mechanism is further provided with a grounding blade linkage associated with the grounding blade, such that, when the grounding blade is switched-on, the circuit breaker can not be swayed in, and when the circuit breaker is in the intermediate position, the grounding blade can not be switched-on.

When the circuit breaker is in the operating position, switching-on can only be enabled when the handle is drawn out.

The circuit breaker according to the present invention comprises the following advantages:

The cart has a much lighter weight which is ⅓ of that of the existing cart, and also has a lower cost than the existing cart.

The cart functions even more perfectly, integrates components which are previously arranged on the switch cabinet, such as the emergency braking button, linkage of the low voltage plug states, and is newly added with functions, such as a circuit breaker which is swayable in/out only when the door is closed, the door being unable to be opened when the cart is at the intermediate position, and status indication of the position of the circuit breaker and so on.

It's newly added with a key lock and a padlock, so that the safety is further improved.

An electrical motor may be directly mounted onto the lead-screw for driving the circuit breaker cart, so as to achieve motor driving.

The circuit breaker cart is mounted onto the switch cabinet, such that the transmission of the cart is more stable without any misalignment, and the cart and the circuit breaker are separated from each other, which enables more stable mechanical characteristics of the circuit breaker.

The forward and backward movement of the driver block for the cart provides for a more reliable switchover of the travel switch.

The present design concept differs obviously from existing chassis carts available on the market, existing problems may be avoided finely.

In other embodiments of the apparatus, there is provided a rack in/out mechanism having simple configuration and being easy for assembly and maintenance, the rack in/out mechanism is especially used for the circuit breaker in the switch cabinet, and also can be used for other apparatus mounted within the cabinet and required to be moved by the electrical motor. The most direct and effective way adopted by the present invention is to joint the drive lead screw of the driver unit for the circuit breaker directly with the electrical motor, no tools and screws are needed for the assembly and disassembly of the electrical motor. The technical solution for the rack in/out mechanism of the present invention is a rack in/out mechanism, which comprises an electrical motor, a retarding mechanism, a drive lead screw, a first mounting plate, a second mounting plate and a third mounting plate, the electrical motor drives the retarding mechanism to move, and the retarding mechanism is coupled with the drive lead screw to drive the drive lead screw, wherein both the electrical motor and the retarding mechanism are assembled onto the first mounting plate at the corresponding positions and are connected through the first mounting plate, the first mounting plate is provided with at least one register pin and/or at least one pilot hole, and both of the drive lead screw and the second mounting plate are fixed onto the third mounting plate at corresponding positions, the second mounting plate is provided with a pilot hole for receiving the register pin and/or a register pin for inserting into the pilot hole, the second mounting plate is fitted with the first mounting plate via the register pin and corresponding to pilot hole, and a output shaft of the retarding mechanism is directly jointed with the drive lead screw to drive the drive lead screw.

In this rack in/out mechanism, the electrical motor and the retarding mechanism are firstly positioned on the first mounting plate at corresponding positions, the drive lead screw and the second mounting plate are positioned on the third mounting plate at corresponding positions, the corresponding positions mean the where the rack in/out mechanism can achieve its functions, and based on different types and models of the adopted electrical motor, the retarding mechanism and/or the drive lead screw, such corresponding positions may be properly regulated to suit different requirements. By means of the register pins and pilot holes respectively provided on the first mounting plate and the second mounting plate and by arranging the positions thereof, it's possible to directly joint the output shaft of the retarding mechanism with the drive lead screw. Using the rack in/out mechanism with such an arrangement, the assembly of the electrical motor and its retarding mechanism is independent of the drive lead screw, and jointing with the drive lead screw may be made after the assembly of the electrical motor and the retarding mechanism, thus when failure occurs for the electrical motor or the retarding mechanism, the electrical motor and the retarding mechanism may also be directly decoupled from the drive lead screw, thereby the service and maintenance for the electrical motor is unlikely influenced by the positions of the drive lead screw and the positions of the devices driven by the drive lead screw, facilitating the replacement of the faulted electrical motor. Moreover, such a rack in/out mechanism provides a simple and reliable manner for transmitting power, by which desired velocity ratio can be obtained through selecting a favorable retarding mechanism, and the retarding mechanism may be the conventional existing products, which reduces the production cost.

Preferably, the electrical motor and the retarding mechanism are mounted onto the first mounting plate at opposite two sides, the output shaft of the electrical motor drives the retarding mechanism to move, the second mounting plate is elbow-shaped or '['-shaped, a side of the '[' shape is fitted on a side of the third mounting plate, and the other side mates with the register pin and/or pilot hole on the first mounting plate through the pilot hole and/or the register pin located at this side, the drive lead screw is positioned at opposite another side of the third mounting plate, the positions of the drive lead screw, the register pin and the pilot hole, the third mounting plate, the second mounting plate and the first mounting plate are arranged in such a way that when the register pins mate with the pilot holes and the rack in/out mechanism is kept in an assembled state, the output shaft of the retarding mechanism is directly jointed with the drive lead screw.

Preferably, the coupling between the retarding mechanism and the drive lead screw is achieved through a clutch. By achieving the connection between the retarding mechanism and the drive lead screw via a clutch, it's easy to achieve the connection and disconnection of the power transmission between the retarding mechanism and the drive lead screw.

Preferably, the retarding mechanism and the clutch are integrated into a housing to create a power transmission mechanism for transmitting the power from the electrical motor, for inputting power to the drive lead screw. With the integration of the retarding mechanism and the clutch, module production is facilitated, and according to the requirement for power input by the drive lead screw, it's possible to select the suitable power transmission mechanism and electrical motor. Preferably, at least a portion of the end of the output shaft of retarding mechanism is a polygonal output shaft, the end of the drive lead screw is formed with a polygonal hole for receiving the polygonal output shaft, the polygonal output shaft cooperates with the polygonal hole so as to transmit the power output from the output shaft of the retarding mechanism to the drive lead screw and rotate the drive lead screw. By designing a portion of the end of the output shaft of the retarding mechanism to be a polygonal output shaft, and the end of the drive lead screw being formed with a polygonal hole for accommodating the polygonal output shaft, it's possible to cooperate the polygonal output shaft with the polygonal hole, thereby the power transmission between the retarding mechanism and the drive lead screw can be achieved by such a cooperation, driving the drive lead screw to move.

Preferably, at least a portion of the end of the drive lead screw is a polygonal output shaft, the end of output shaft of the retarding mechanism is formed with a polygonal hole for receiving the polygonal output shaft, the polygonal output shaft cooperates with the polygonal hole so as to transmit the power output from the output shaft of the retarding mechanism to the drive lead screw and rotate the drive lead screw. With such a design, it's still possible to achieve the power transmission between the retarding mechanism and the drive lead screw, thus driving the drive lead screw to move.

Preferably, the polygon is a regular hexagon, a square or an equilateral triangle.

The regular hexagon, the square and the equilateral triangle are shapes easy to be machined. Preferably, at least a portion of the end of the output shaft of the retarding mechanism is formed with key outward protruding from the output shaft, and the end of the drive lead screw is formed with keyway for receiving the key, and by the cooperation of the key and the keyway, the power output from the output shaft of the retarding mechanism is transmitted to the drive lead screw and rotates the drive lead screw.

Preferably, the rack in/out mechanism is further provided with a rotating side plate which is fixed to the fourth mounting plate via a rotary pin and may pivot around the rotary pin, the fourth mounting plate and the side of the second mounting plate provided with the register pin and/or the pilot hole are connected together, the first mounting plate is provided with two register pins or two pilot holes, and the second mounting plate is provided with two pilot holes or two register pins corresponding to the two register pins or two pilot holes on the first mounting plate, the register pin is formed with a groove, the shape and position of the rotating side plate are designed in such a way that when the rotating side plate is rotated to a certain position, the edge of the rotating side plate is caught into the groove of the register pin to lock the first mounting plate and the second mounting plate.

By designing the fourth mounting plate and the rotating side plate with such a configuration, the edge of the rotating side plate may be caught into the groove of the pin when the rotating side plate is rotated, thus the first mounting plate and the second mounting plate is locked, and in such an assembly manner, it's possible to lock the first mounting plate and the second mounting plate without requiring the connecting manner, such as threaded connection, soldering and the like, allowing for simple assembly and disassembly manners, the rotating side plate is only required to be rotated in opposite direction to unlock the relative fixation between the first mounting plate and the second mounting plate.

Preferably, the rotating side plate is provided with a knob for facilitating the rotation of the rotating side plate.

The knob provided on the rotating side plate makes it convenient for the user to rotate the rotating side plate, thus meeting the human engineering design.

Preferably, the rack in/out mechanism is used for a circuit breaker driven by a cart, and the cart is driven by a driver block provided on the drive lead screw, which driver block transforms the rotary motion of the drive lead screw into linear motion.

Preferably, the third mounting plate is a baseplate of the switch cabinet for accommodating the circuit breaker.

The rack in/out mechanism is especially adapted to be used for the driving of the circuit breaker driven by a cart within the switch cabinet, and overcomes the deficiencies in prior art that the electrical motor of the cart for driving the circuit breaker is difficult to repair and has lower transmission efficiency.

There is also provided a method for assembling the above rack in/out mechanism, comprising steps as follows, assembling the electrical motor and the retarding mechanism together through the first mounting plate, assembling the drive lead screw and the second mounting plate onto the third mounting plate, assembling the fourth mounting plate and the rotating side plate together, then assembling the fourth mounting plate and the second mounting plate together, positioning the assembled electrical motor and the retarding mechanism by the cooperation between the register pin and the pilot hole, directly jointing the output shaft of the retarding mechanism with the drive lead screw, then rotating the above-mentioned rotating side plate to lock the first mounting plate and the second mounting plate.

By assembling the second mounting plate and the third mounting plate as well as assembling the second mounting plate with the fourth mounting plate, which assembling are all achieved by threaded connection, the holes through which the bolts pass are aligned with each other by the above cooperation, thus it's possible to achieve firstly positioning the second mounting plate on the third mounting plate at appropriate position, and then positioning the fourth mounting plate on the second mounting plate at appropriate position, generally the third mounting plate is commonly an unmovable plate, hence, by selecting the position of the holes through which the bolts pass, the second mounting plate and the fourth mounting plate may be well placed at desired positions, so as to eventually achieve the directly jointing of the output shaft of the retarding mechanism with the drive lead screw.

The rack in/out mechanism according to the present invention overcomes the weakness of the rack in/out mechanism in prior art that the electrical motor thereof is difficult to repair and replace, while providing higher transmission efficiency and lower manufacturing cost.

A detailed description of an embodiment of the invention with reference to the figures beings now.

DETAILED DESCRIPTION

The present invention discloses a novel swayable in/out driver mechanism, that is, for a circuit breaker cart 1. The circuit breaker cart 1 and the circuit breaker 2 are arranged separately. Specifically, the circuit breaker cart 1 is fixedly mounted onto the switch cabinet, and a small-sized circuit breaker drive block 15 is used to drive the circuit breaker 2 move forward and backward. The circuit breaker drive block 15 could be stopped and reversed so as to separate the circuit breaker cart 1 from the circuit breaker 2, to push out or load in the circuit breaker 2.

Figure 1:
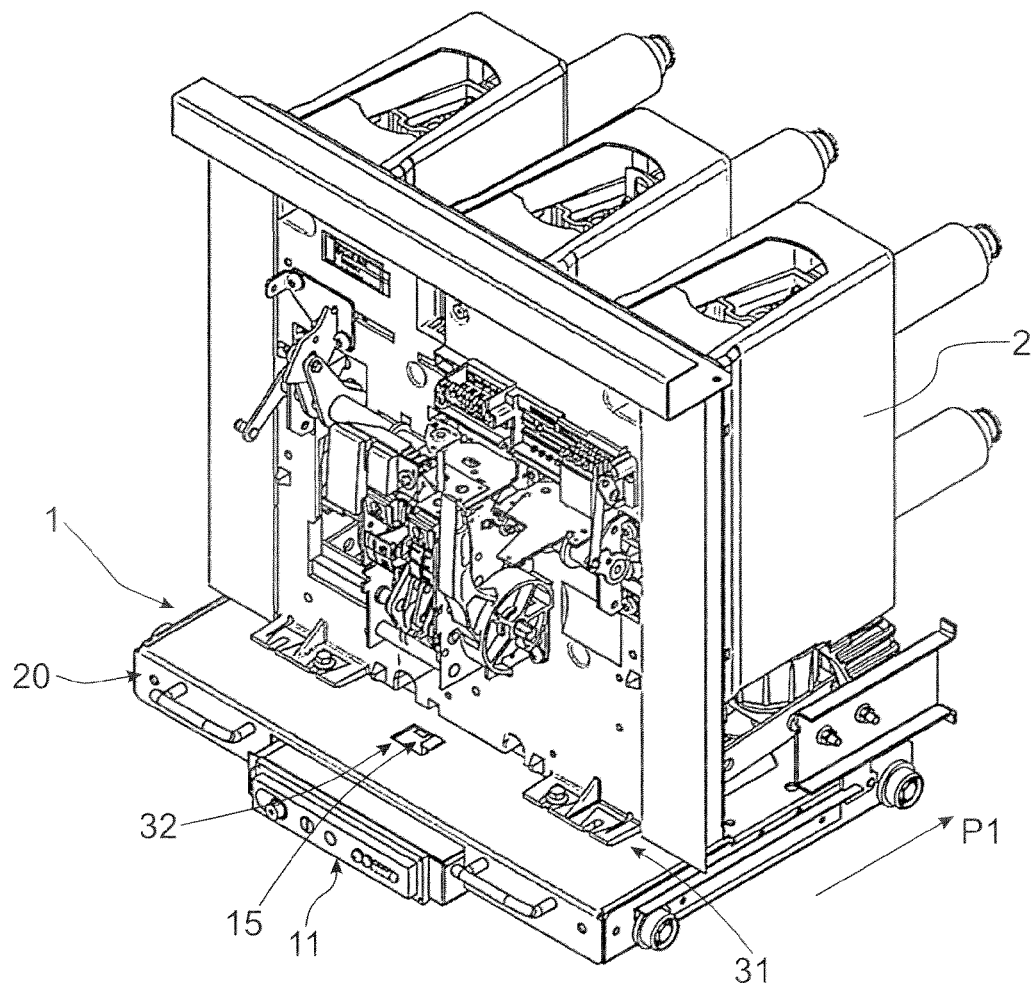
FIG. 1 is a view showing the entirety of the relative position between the circuit breaker cart aid the circuit breaker.
Figure 2:
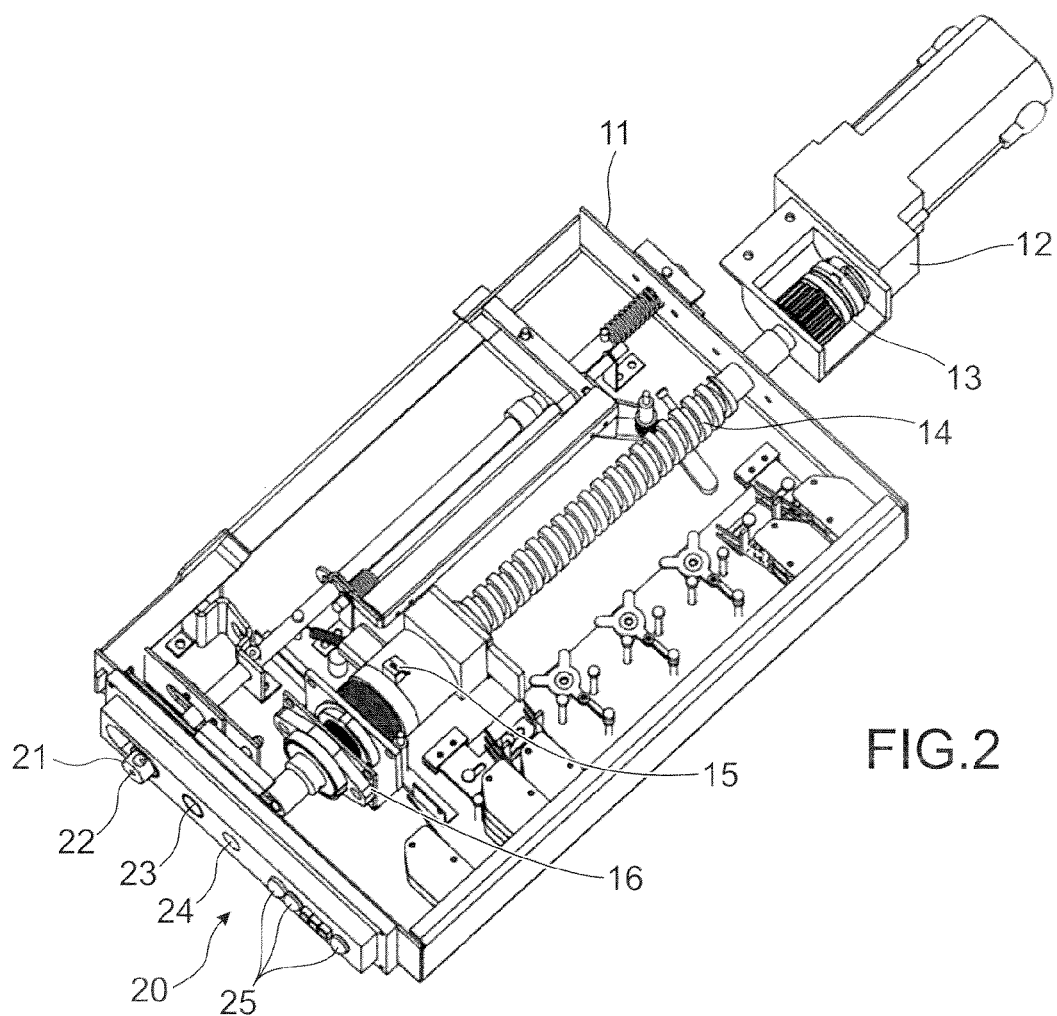
FIG. 2 is a schematic view showing the concrete configuration of the circuit breaker cart.

Hereinafter, the configuration and working principle for the cart would be specifically described in conjunction with the drawings. Referring FIG. 1, the circuit breaker cart 1 is located right below the circuit breaker 2, fixed with respect to the switch cabinet, connected with the circuit breaker 2 via the circuit breaker drive block 15 in the cart. The circuit breaker 2 is brought to move backward or forward electrically or manually with the rotation of the lead-screw. FIG. 2 is a schematic view showing the concrete configuration of the circuit breaker cart 1. Wherein the circuit breaker cart 1 comprises a cart body 11, an electrical motor 12, a clutch 13, a lead-screw 14, the circuit breaker drive block 15 and so on. The cart body 11 is fixed onto the switch cabinet, the lead-screw 14 is assembled onto the cart body through the lead-screw anchor support 16, and the lead-screw 14 can only rotate and be directly driven via a handle or an electrical motor. The output shaft of the electrical motor 12 is oppositely jointed to the main shaft of the lead-screw 14, and may drive the circuit breaker drive block 15 to move forward and backward along the lead-screw 14 with the rotation of the lead-screw 14.

The circuit breaker drive block 15 may drive the circuit breaker 2 to switch between the operating position and the testing position.

Figure 3:
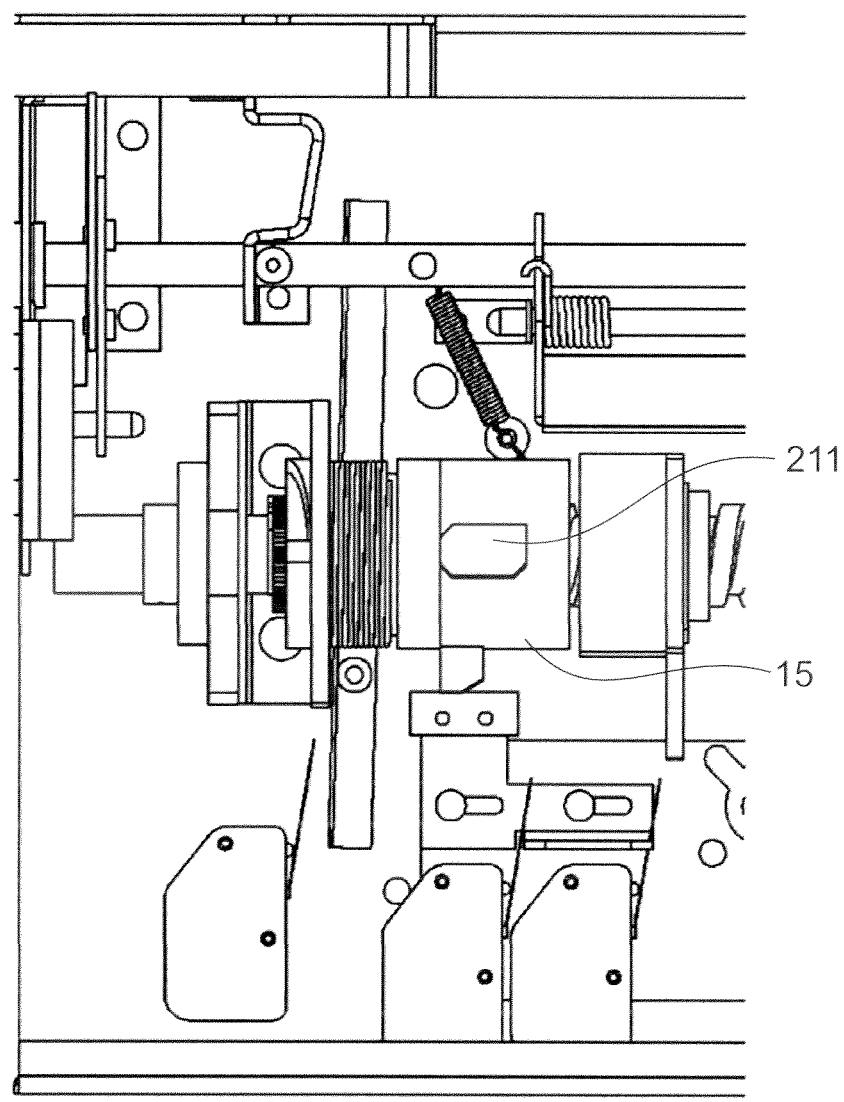
FIG. 3 is a schematic view showing the connection state between the driver block for the circuit breaker cart and the circuit breaker.
Figure 4:
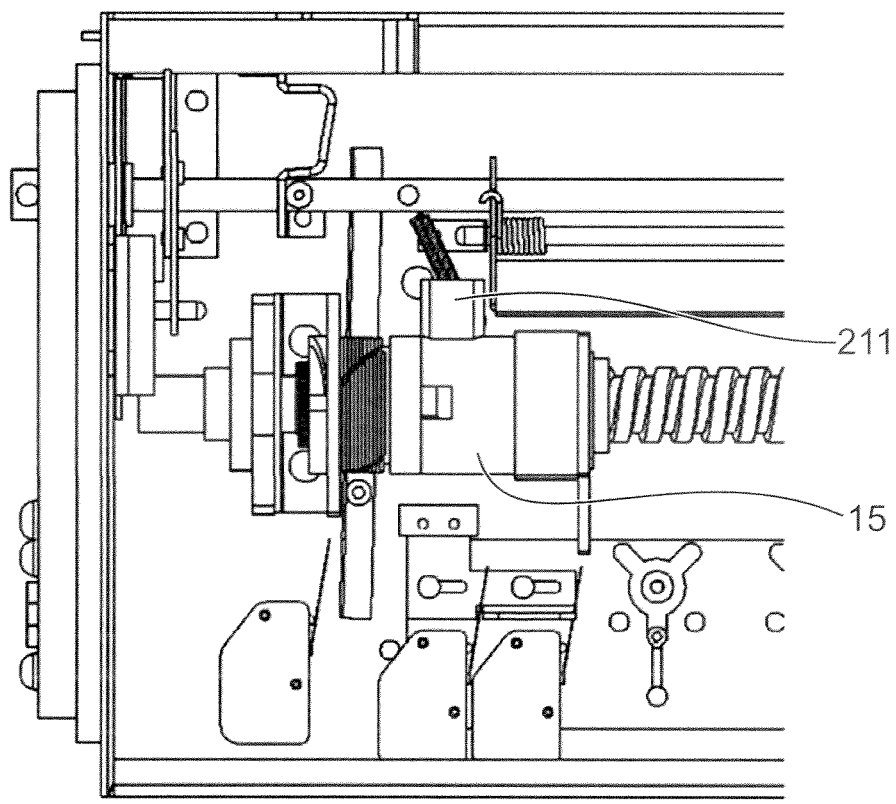
FIG. 4 is a schematic view showing the disconnection state between the driver block for the circuit breaker cart and the circuit breaker.

The circuit breaker drive block 15 is coupled with the lead-screw 14 via thread. When the lead-screw 14 rotates, due to the circuit breaker drive block 15 is located within the elongated slot and thus moves forward and backward along the lead-screw 14, it's possible to make the circuit breaker to switch between the operating position and the testing position. When the circuit breaker is approaching the testing position, the circuit breaker drive block 15 may turn upward by 90° from the state shown in FIG. 3, such that the circuit breaker drive block 15 and the circuit breaker 2 are disconnected from each other and present the state shown in FIG. 4; and in the disconnection state (as shown in FIG. 4), it's also possible for the circuit breaker drive block 15 and the circuit breaker 2 to turn downward by 90°, so as to achieve the connection between the circuit breaker drive block 15 and the circuit breaker 2, i.e., the state shown in FIG. 3.

The circuit breaker cart 1 further comprises a front panel 20 of the cart, which panel can protrude from the door of the switch cabinet so as to operate the circuit breaker 2 and also comprises the functions of information indication and linkage.

Referring to FIG. 2, the front panel 20 of the cart comprises an emergency braking button 21, a padlock 22, a key lock 23, an insertion aperture 24 for handle operation, and various status indication device 25 and so on. Wherein, the emergency braking button 21 comprises the following functions: (1) emergency braking, (2) improper operation proofing, and (3) mechanical and electrical block. The emergency braking button 21 has a striking color, for example, red color. When the door of the switch cabinet is closed, the operator may use one simple action to complete a series of motions, namely pressing the emergency braking button 21 and moving laterally, then releasing the emergency braking button 21, without complicated operations required in traditional emergency braking button, for example, rotation and the like.

The insertion aperture 24 for handle operation is used for inserting the handle to perform manual operation. When the circuit breaker 2 is at the testing position, if it's required to pull out the circuit breaker 2 from the switch cabinet, the circuit breaker driver block 15 and the circuit breaker 2 is must be separated from each other, the mechanism according to the present invention can automatically achieve the connection and separation of the circuit breaker drive block 15 and the circuit breaker 2 by swaying the handle, no additional operation is needed.

Also, the driver mechanism of the present invention may achieve the function in which only when the door is closed could the circuit breaker be swayed in/out. When the front door of the switch cabinet is not closed, the handle slide blocks the handle insertion aperture 24, so that it's impossible to sway in/out the circuit breaker by manually swaying the handle, and the micro-switch on the door does not switch, the power-driven circuit is disconnected.

When the front door of the switch cabinet is closed, the front door of the switch cabinet pushes the door linking plate, presses down the opening button, while slides leftwards into the stop hole, the handle slide yields from the handle insertion aperture and thus the handle can be inserted to carry out manual operation. During the above operations, by a connection plate disconnecting the power-driven circuit, the driver mechanism of the present invention may also achieve the function which can not be electrically achieved in the case of manually implementation. The driver mechanism of the present utility model may also be optionally assembled with a key lock. In such a case, the lock must be unlocked in advance, so that the handle slide can be slid.

The driver mechanism of the present invention may also control the driving operation through low voltage plug linkage, such that, when no low voltage plug is inserted or reliably inserted, the cart can not be swayed.

According to the driver mechanism of the present utility model, when the circuit breaker is in the intermediate position, the door of the switch cabinet cannot be opened; the cart and the gain on the door linking plate lock the stop pin on the door.

The driver mechanism is further provided with a grounding blade linkage associated with the grounding blade, such that, when the grounding blade is switched-on, the circuit breaker can not be swayed in, and when the circuit breaker is in the intermediate position, the grounding blade can not be switched on. When the circuit breaker is in the intermediate position, the grounding blade can not be switched on.

When the circuit breaker is swayed into the operating position, switching-on can only be enabled when the handle is drawn out.

The output shaft of the electrical motor is directly coupled with the main shaft of the cart, and positioning panel for the electrical motor is used to prevent the detachment of the output shaft of the electrical motor, so as to attain the purpose of direct driving the circuit breaker cart. Other details of this part of the invention will be given now.

The circuit breaker 2 may be moved between a testing position (FIG. 1) and a working position. As shown in FIG.

Figure 5:
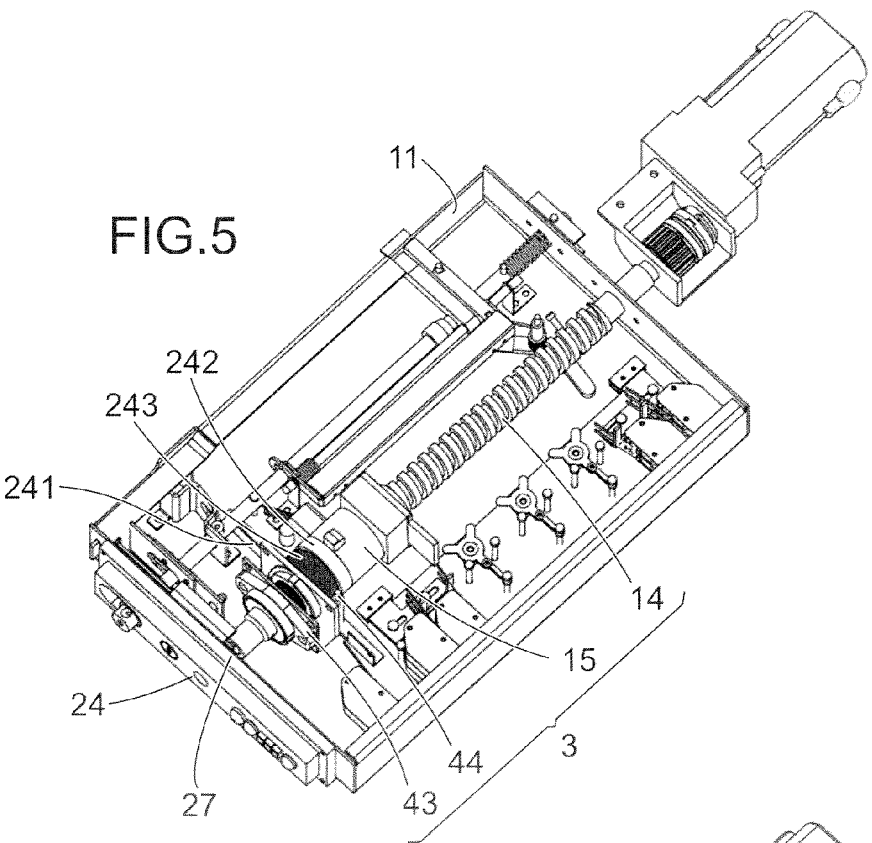
FIG. 5 is a schematic view showing a separating device in separating state, with the circuit breaker being in the testing position.
Figure 6:
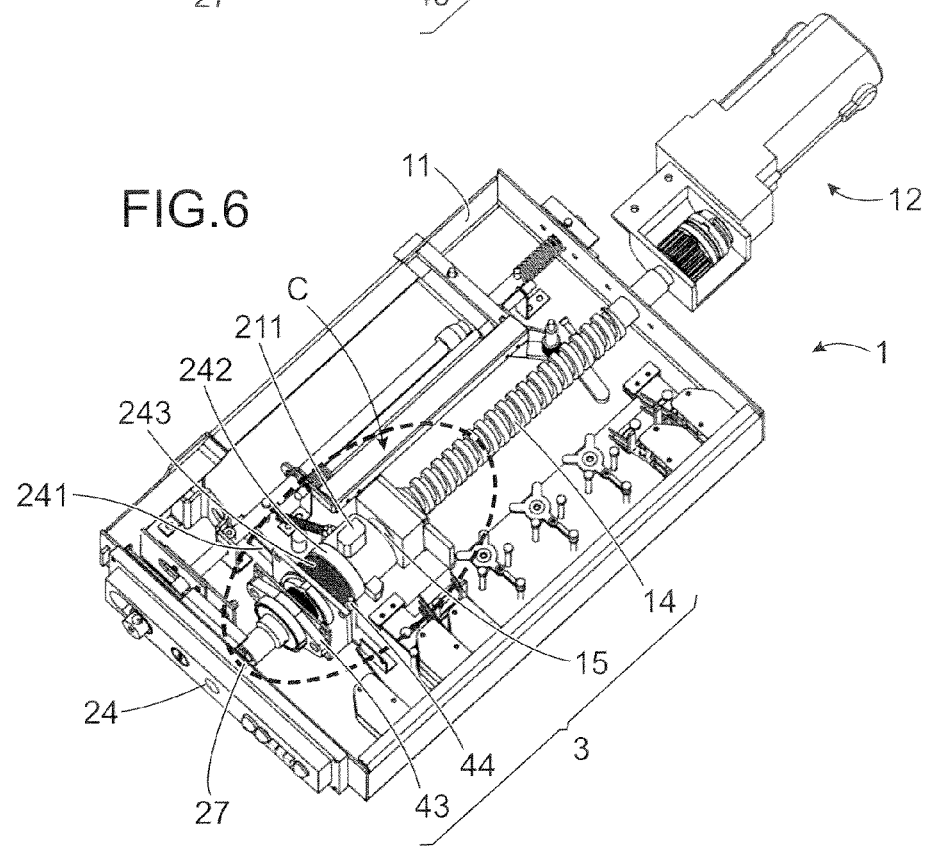
FIG. 6 is a schematic view showing the separating device in joining state, with the circuit breaker being in the testing position.

4, the circuit breaker 2 may comprise a floor 31 on which there is provided an aperture 32 which can be used for accommodating a drive protuberance 211 for driving the circuit breaker 2 to move between the testing position and the working position (as shown in FIG. 6, which will be described below in detail). The cart 1 may be fixedly mounted on the switch cabinet (not shown) and mounted to the circuit breaker 2. The cart 1 may be provided with an elongate slot 70 (shown in FIGS. 7A and 7B) on its top 71, which extends in a direction from the testing position to the working position of the circuit breaker 2 (referred as to a first direction P1 hereinafter) and which extends vertically under the aperture 32, such that the drive protuberance 211 on the drive block 15 for driving the circuit breaker 2, which moves between the testing position and the working position may protrude into the circuit breaker 2 from the elongate slot. Referring now to FIG. 5, a device 3 for automatically separating and joining the circuit breaker 2 and the cart 1 is mounted in the cart body 11. The device comprise the drive block 15, a lead screw 14, a lead screw fixing support 43 for fixing and carrying the lead screw 14, a guiding device 44. The guiding device 44 may be used to drive the drive block 15 to rotate between the separating position and the joining position, as explained in detail below.

The lead screw fixing support 43 may be fixedly mounted within the cart body 11, for carrying the lead screw rod 14.

The drive block 41 may be sheathed on the lead screw 14, with its threads being engaged with those of the lead screw 14. The drive block 15 may be provided with the drive protuberance 211 thereon, which may pass through the elongate slot 70 arranged on the top 71 of the cart 1 and be engaged in the aperture 32 in the floor 31 of the circuit breaker 2. The drive block 15 may rotate between a joining position and a separating position at an end of its stroke along the lead screw 14, wherein the joining position corresponds to a position in which the drive protuberance 211 of drive block 15 protrudes out of the elongate slot arranged on the top of the truck 1 and is engaged in the aperture 32 of the bottom of the circuit breaker 2, for example, referring to FIG. 6, here the drive protuberance 211 of the drive block 21 is in a vertical position. The elongate slot has a width substantially equal to that of the drive protuberance 211, so as to prevent rotation of the drive block 15 relative to the cart body 11 and the circuit breaker 2 during the rotation of the screw rod, and to allow the translation movement of the drive block 15 along an axial direction of the lead screw 14. The separating position of the drive block 15 corresponds to a position in which the drive protuberance 211 of drive block 15 is not engaged with the elongate slot arranged on the top of the cart 1 and therefore is not engaged with the opening of the bottom of the circuit breaker 2 so as to make circuit breaker 2 detach from the truck, for example, referring to FIG. 5, here the drive protuberance 211 of drive block 15 falls down to be at a horizontal position.

A positioning protuberance 212 may further be provided on the drive block 15, which is used for positioning the circuit breaker 2 on the cart 1 when the circuit breaker 2 and the cart 1 are being mounted. The positioning protuberance 212 may have a height less than that of the drive protuberance 211, and is offset with respect to the drive protuberance 211 in the first direction P1, such that the positioning protuberance 212 would not protrude from the elongate slot of the top of the cart 1 so as to engage in the opening of the bottom of the circuit breaker 2 when the drive block 15 rotates from the separating position to the joining position.

The separating-joining device may also comprise a handle inserting hole 27 arranged in an end of the lead screw 14 close to the front face of the cart 1. The position of the handle inserting hole 27 corresponds to that of the handle operation hole 24 on the cart body 11, such that the handle may enter the handle inserting hole 27 when inserted through the handle operation hole 24.

The guiding device 44 may comprise, for example, a fixing plate 241, a guiding sleeve 242, an elastic member such as a torsion spring 243. The fixing plate 241 may be mounted to the lead screw fixing support 43 fixedly, situated on a side of the lead screw fixing support 44 opposite to the handle inserting hole 27. The guiding sleeve 242 may be sheathed on the screw rod and pass through the fixing plate 241, situated between the drive block 15 and the lead screw fixing support 45. A guiding pin 244 is provided on an end of the guiding sleeve 242 away from the handle inserting hole 27. The guiding pin 244 protrudes in a direction facing away from the handle inserting hole 27. The guiding pin 244 may be connected to a corresponding guiding pin connection (numbered as 213 in FIG. 7A), for example a hole, arranged in the drive block 15, for the union rotation of the guiding sleeve 242 and the drive block, for example 90 degrees, so as to drive the drive block 15 to rotate between the separating position and the joining position.

Teeth 221 may be provided at an end of the lead screw rod 14 close to the handle inserting hole 27. The teeth 221 may be fixed with respect to and rotate with the screw rod 22. Meanwhile, external teeth 2421 may be provided at an end of the guiding sleeve 242 close to the handle inserting hole 27, for meshing with the teeth 221 of the lead screw 14. When the two are meshed, the guiding sleeve 242 may be rotate fixedly with the lead screw 14 when the handle is turned to make the lead screw 14 to rotate, so as to make the drive block 15 rotate with the two. Optionally, the teeth 221 of the lead screw 14 may be gear structure, helical teeth, or spline structure.

Figure 7A:
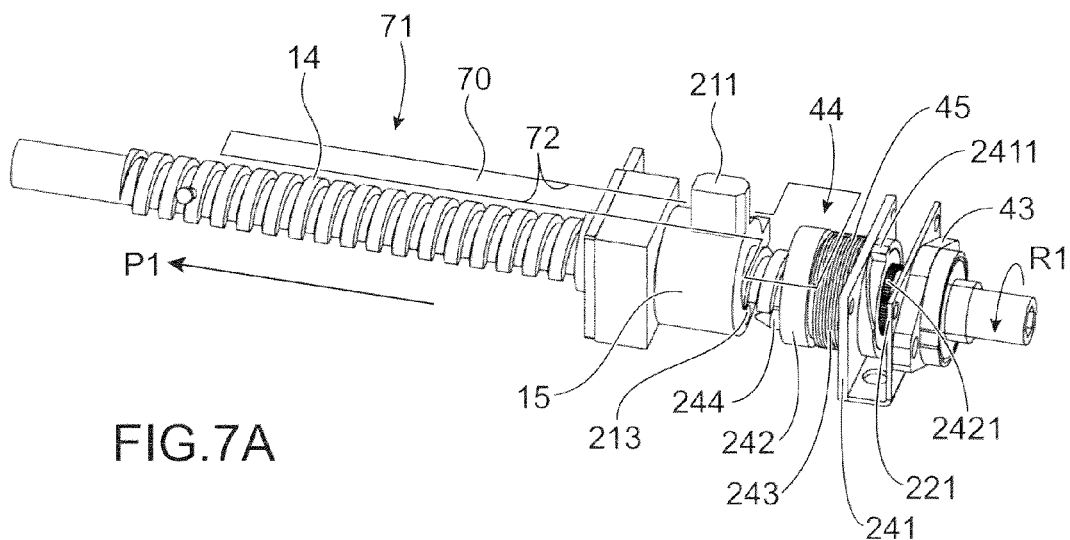
FIGS. 7A and 7B is a local enlarged schematic view of a circle C in FIG. 6.
Figure 7B:
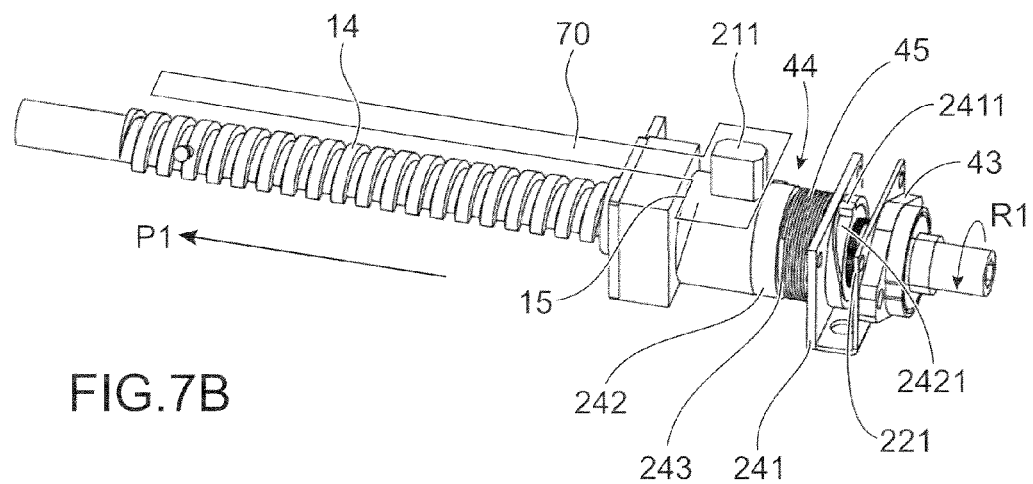

Referring to FIGS. 7A and 7B, they are enlarged schematic views of a circle C in FIG. 6, wherein the drive block 15 is located in the joining position. A step 2411 may also be provided on the fixing plate 241, on a side of the fixing plate 241 facing towards the handle inserting hole 24. An end of the guiding sleeve 242 having the external teeth 2421 is located on the same side as the step 2411 and cooperates with the step 2411 for assisting in the full meshing of the teeth 221 of lead screw 14 and the external teeth 2421 on the guiding sleeve 242.

The torsion spring 243 may be sheathed on the guiding sleeve 242, one end of which is connected against the fixing plate 241 and the other end of which is connected against to a circular convex part arranged on the guiding sleeve, for separating the external teeth 2421 of guiding sleeve 242 from the teeth 221 of screw rod 22 by means of the effect of the torsion spring 243 when the drive block 15 is turned from the joining position to the separating position. Those skilled in the art should understand that the guiding device 24 may have other forms, as long as the rotation of the drive block 15 between the separating position and the joining position can be obtained.

FIGS. 7A and 7B show that the edges 72 of the elongate slot 70 prevent the drive block 15 from rotating by retaining the protuberance 211, but the rotation becomes possible at the position in which the drive block 15 has left the elongate slot 70 and the protuberance 211 is free.

The working mode of the separating-joining device 3 for automatically separating the circuit breaker 2 and the cart 1 will be described in detail below. As shown in FIGS. 7A and 7B, when the circuit breaker 2 is located in the working position and it is desired to separate the circuit breaker 2 and the cart 1, the handle is inserted into the handle operation hole 24 on the front face of the cart body 11, and thus inserted into the handle inserting hole 27 of separating-joining device 3. The handle is rotated in a first rotation direction R1 (in this example, anticlockwise direction). Herein, the drive protuberance 211 of drive block 15 passes through the elongate slot (not shown) of top of the truck, while the rotation of the handle drive the lead screw 14 to rotate, such that the drive block 15 sheathed on the lead screw rod 14 drives the circuit breaker 2 to translate towards a reverse direction to the first direction (i.e. towards the testing position). When the drive block 15 is close to the testing position, the drive block 15 may contact the guiding sleeve 242 and be connected to the guiding sleeve 242 through the guiding pin 244. As the lead screw 14 rotates further, the drive block 15 continues to move towards the testing position, so as to press the guiding sleeve 242 towards a reverse direction of the first direction to make the external teeth 2421 of the guiding sleeve 242 to mesh the teeth 221 fixed to the lead screw 14. When they are meshed, the drive block 15 and the guiding sleeve 242, together with the teeth 221, move in the first rotation direction R1. At same time, the step 2411 on the fixing plate 241 can cause the external teeth 2421 of the guiding sleeve 242 and the teeth 221 to mesh completely. Then, the handle is turned to cause the drive block 15 to rotate 90 degrees along the first rotation direction R1, the drive protuberance 211 may disengage from the elongate slot and the drive block 15 reaches the separating position, such that the circuit breaker 2 is separate from the cart 1.

When the circuit breaker 2 is located in the testing position and it is desired to join the circuit breaker 2 and the cart 1 automatically, the drive block 15 is located in the separating position as shown in FIG. 6, the handle is turned to cause the drive block 15 to rotate 90 degrees along a direction reverse with respect to the first rotation direction R1 (for example, clockwise direction) to the joining position. Then, the drive protuberance 211 on the drive block 15 is engaged in the elongate slot, and the teeth 221 are dis-meshed and thus separate from the external teeth 2421 on the guiding sleeve 242 by means of the torsion spring 45. The handle is turned continuously; since the drive protuberance 211 is engaged in the elongate slot, such that the separated drive block 15 is translated along an axis of the lead screw 14 towards the testing position in the first direction P1 without rotation. The device for automatically separating and joining the circuit breaker and the truck is described above.

Hereinafter, reference will be made to FIGS. 8 to 18 to describe the detailed embodiments of the rack in/out mechanism according to the present invention in detail. Through description of these detail embodiments, the skilled in this art may comprehend the present invention even more clearly. It should be noted that the protective scope of the present invention is not limited to the specific embodiments explained in detail, the modifications of the present invention made by the skilled in this art based on the teaching of the present disclosure also fall in the protective scope of the present invention.

Figure 8:
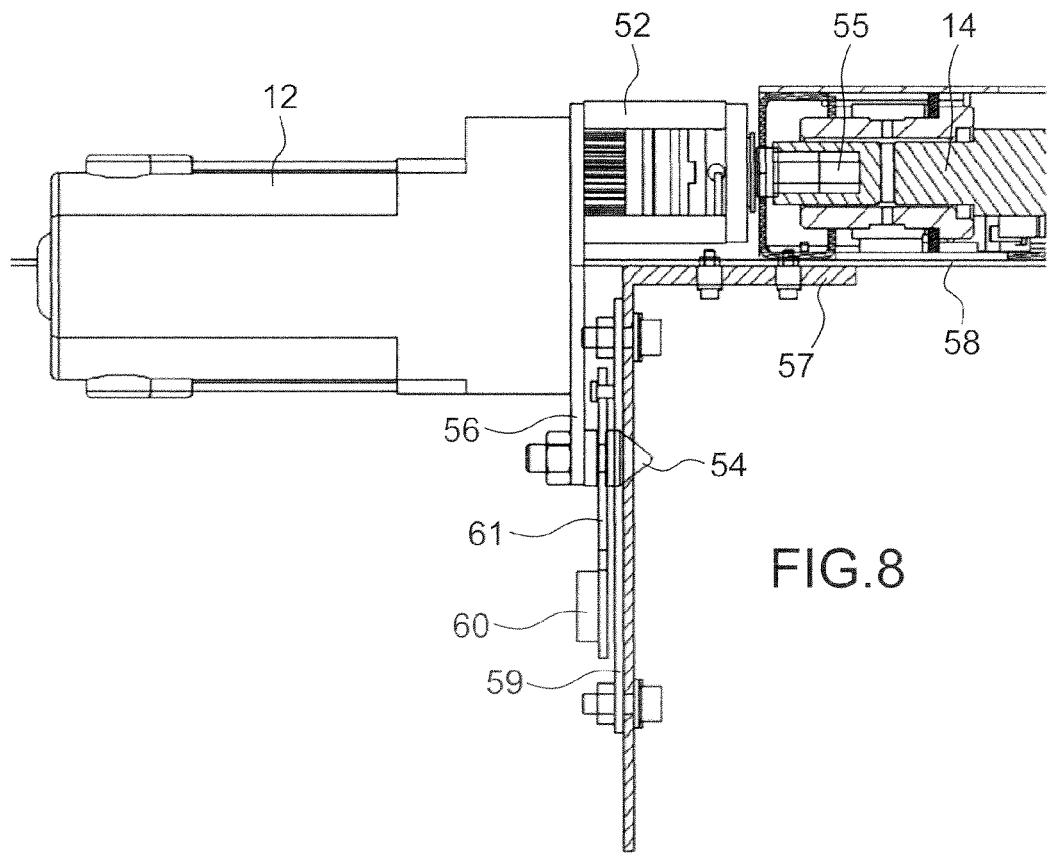
FIG. 8 is a structural schematic view of a rack in/out mechanism according to the present invention.

FIG. 8 is a schematic view showing the rack in/out mechanism according to the present invention, the rack in/out mechanism comprises the electrical motor 12, a retarding mechanism 52, the lead screw 14, a first mounting plate 56, a second mounting plate 57 and a third mounting plate 58, the electrical motor 12 drives the retarding mechanism 52 to move, the retarding mechanism 52 is coupled with the lead screw 14 through the clutch 13, the output shaft 62 of the retarding mechanism 52 (see FIG. 9) is connected with the lead screw 14 to drive the lead screw 14 to move, and both the electrical motor 12 and the retarding mechanism 52 are assembled onto the first mounting plate 56 and are connected through the first mounting plate 56, and both the lead screw 14 and the second mounting plate 57 are fixed onto the third mounting plate 58, the first mounting plate 56 is provided with at least one register pin 54, the second mounting plate 57 is formed with a pilot hole 65 for receiving the register pin 54 (see FIG. 10), the second mounting plate 57 is fitted with the first mounting plate 56 via the register pin 54 and the corresponding pilot hole 68, so as to directly joint the output shaft 62 of the retarding mechanism 52 with the lead screw 14 to move the lead screw 14. Although the register pin 53 in this embodiment is provided on the first mounting plate 56 and the pilot hole 68 is formed in the second mounting plate 57, it's also possible to provide the pilot hole 68 in the first mounting plate 56 and provide the register pin 54 on the second mounting plate 57, or alternatively, it's further possible to provide the register pin 54 and the pilot hole 68 on the first mounting plate 56 simultaneously while providing the pilot hole 68 and the register pin 54 mated therewith on the second mounting plate 57.

In the rack in/out mechanism according to the present invention, the electrical motor 12 and the retarding mechanism 52 are firstly positioned on the first mounting plate 54, the lead screw 14 and the second mounting plate 57 are positioned on the third mounting plate 58, the mounting positions are designed such that the rack in/out mechanism can eventually achieve the position for the directly jointing of the output shaft 62 of the retarding mechanism 52 with the lead screw 14. Based on different types and models of the adopted electrical motor, the retarding mechanism 52 and/or the lead screw 14, such mounting positions may be properly regulated to suit different requirements. By means of the register pins 54 and pilot holes 68 respectively provided on the first mounting plate 56 and the second mounting plate 57 and by arranging the positions thereof, it's possible to directly joint the output shaft 62 of the retarding mechanism 52 with the lead screw 14. Using the rack in/out mechanism with such an arrangement, the assembly of the electrical motor 12 and its retarding mechanism 52 is independent of the lead screw 14, and directly jointing with the lead screw 14 may be made after the assembly of the electrical motor 12 and the retarding mechanism 52, thus when failure occurs for the electrical motor 12 or the retarding mechanism 52, the electrical motor 12 and the retarding mechanism 52 may also be directly uncoupled from the lead screw 12, thereby the service and maintenance for the electrical motor 12 is unlikely influenced by the positions of the lead screw 14 and the positions of the devices driven by the lead screw 14, facilitating the replacement of the faulted electrical motor 12. Moreover, such a rack in/out mechanism provides a simple and reliable manner for transmitting power, by which a desired velocity ratio can be obtained through selecting a favorable retarding mechanism 52, and the retarding mechanism may be the conventional existing products, which reduces the production cost.

Figure 9:
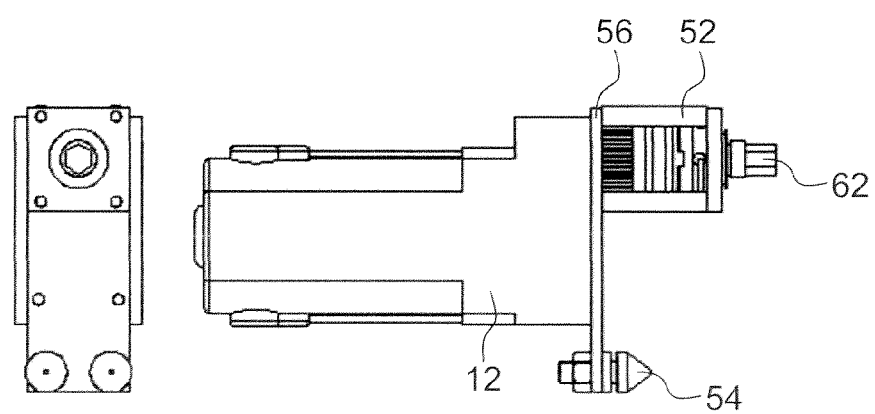
FIG. 9 are front view and right view of the assembled electrical motor and the retarding mechanism.
Figure 10:
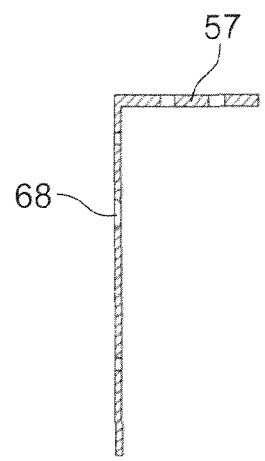
FIG. 10 is a sectional view of the second mounting plate.
Figure 11:
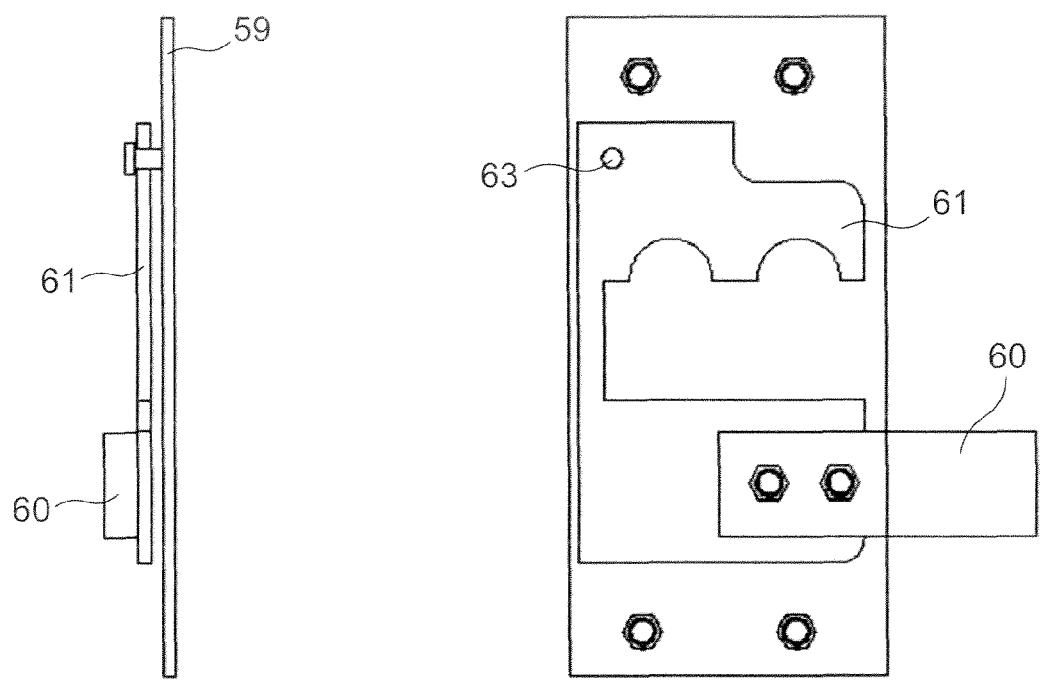
FIG. 11 are the front view and right view of the assembled rotating side plate, the handle and the fourth mounting plate.

FIG. 9 illustrates the schematic view of the assembled electrical motor 12 and the retarding mechanism 52, FIG. 10 shows a sectional view of the second mounting plate 57. Further, in conjunction with FIGS. 9 and 10, the electrical motor 12 and the retarding mechanism 52 are respectively mounted onto the opposite two sides of the first mounting plate 56, the output shaft of the electrical motor 12 drives the retarding mechanism 52 to move, the second mounting plate 57 is elbow-shaped or '⌈'-shaped, and a side of the '⌈' shape, which is the upper one in FIGS. 10 and 8, is fitted at the underside of the third mounting plate 68, and the other side, which is the left one in drawings, mates with the register pin 54 on the first mounting plate 56 through the pilot hole 68 at this side, the lead screw 14 is positioned at opposite upper side of the third mounting plate 58, the positions of the lead screw 14, the register pin 54 and the pilot hole 68, the third mounting plate 58, the second mounting plate 57 and the first mounting plate 56 are arranged in such a way that when the register pin 54 mates with the pilot hole 68 and the rack in/out mechanism is kept in an assembled state, the output shaft 62 of the retarding mechanism 52 is directly jointed with the lead screw 14.

By designing the second mounting 57 plate to be '⌈'-shaped, locating the lead screw 14 above a side of the '⌈' shape, positioning the lead screw 14 above the third mounting plate 58, and positioning the '⌈'-shaped second mounting plate 57 below the third mounting plate 58, the positions of the '⌈'-shaped second mounting plate 57 and the lead screw 14 are relatively determined, and the other side of the '⌈'-shaped second mounting plate 57 is used for the positioning of the electrical motor 12 and the retarding mechanism 52, hence it's possible to achieve the positioning of the retarding mechanism 52 with respect to the lead screw 14 by the positioning of the second mounting plate 52 with respect to the lead screw 14, thereby implementing the directly jointing of the output shaft 62 of the retarding mechanism 52 with the lead screw 24.

In this embodiment, the coupling between the retarding mechanism 52 and the lead screw 14 is achieved through the clutch 13.

By achieving the connection between the retarding mechanism 52 and the drive lead screw 14 via a clutch, it's easy to achieve the connection and disconnection of the power transmission between the retarding mechanism 52 and the lead screw 14.

The retarding mechanism 52 and the clutch 13 may also be integrated into a housing to create a power transmission mechanism for transmitting the power from the electrical motor, for inputting power to the drive lead screw.

With the integration of the retarding mechanism 52 and the clutch 13, module production is facilitated, and according to the requirement for power input by the lead screw 14, it's possible to select the suitable power transmission mechanism and electrical motor 12.

At least a portion of the end of the output shaft 62 of the retarding mechanism 52 is a polygonal output shaft, the end of the lead screw 14 is formed with a polygonal hole 55 for receiving the polygonal output shaft 62, the polygonal output shaft 62 cooperates with the polygonal hole 55 so as to transmit the power output from the output shaft 62 of the retarding mechanism 52 to the lead screw 14 and rotate the lead screw 14.

By designing a portion of the end of the output shaft 62 of the retarding mechanism 52 to be the polygonal output shaft 62, and the end of the lead screw 14 being formed with the polygonal hole 55 for accommodating the polygonal output shaft, it's possible to cooperate the polygonal output shaft 62 with the polygonal hole 55, thereby the power transmission between the retarding mechanism 52 and the lead screw 14 can be achieved by such a cooperation, driving the lead screw 14 to move.

In this embodiment, the output shaft 52 being used is an outer hexagonal shaft, and the hole 55 mated therewith is an inner hexagonal mounting hole. It's to be noted that the output shaft 62 is not limited to the regular hexagonal shaft, the square shaft or the equilateral triangle shaft is also possible, as long as the shapes of the shaft and the hole 55 mated therewith are designed such that the power can be transmitted from the output shaft 62 to the lead screw 14.

In order to transmit the power from the output shaft 52 to the lead screw 14, at least a portion of the end of the output shaft 52 of the retarding mechanism 62 may also be formed with a key outward protruding from the output shaft 52, and the end of the lead screw 14 is formed with a keyway for receiving the key, and by the cooperation of the key and the keyway, the power output from the output shaft 62 of the retarding mechanism 52 is transmitted to the lead screw 14 and rotates the drive lead screw 14. Such embodiments are not shown in the drawings.

In addition to the above connecting type, the polygonal output shaft 62 may also be provided on the lead screw 14, and the inner polygonal hole 55 corresponding to the polygonal output shaft 62 is formed in the output shaft 62 of the retarding mechanism 52. The key may also be provided on the lead screw 14, and the keyway is formed on the end of the output 62 shaft of the retarding mechanism 52. All connecting types, as long as they can achieve the power transmission between the output shaft 62 of the retarding mechanism 52 and the lead screw 14, may be used herein.

The rack in/out mechanism is also provided with a rotating side plate 61, FIGS. 11-15 illustrate structural schematic views of the rotating side plate 61 and a fourth mounting 59 plate in their state of being separated and assembled as well as being used in different state. As shown in FIG. 19, the rotating side plate 61 is fixed to the fourth mounting plate 59 via a rotary pin 63 and is pivotable around the rotary pin 63, the fourth mounting plate 59 and the side of the second mounting plate 57 provided with the pilot holes 68 are connected together through a threaded connection, but other connection manners are also possible, the first mounting plate 56 is provided with two register pins 54, and the second mounting plate 57 is provided with two pilot holes 68 corresponding to the two register pins 54 on the first mounting plate 56, the register pins 54 are formed with a groove 64 (see FIG. 16), the shape and position of the rotating side plate 61 are designed in such a way that when the rotating side plate 61 is rotated to a certain position, the edge of the rotating side plate 61 is caught into the groove 64 of the register pin 54 to lock the first mounting plate 56 and the second mounting plate 57, the rotating side plate 61 is provided with a knob 60 to facilitate the rotation of the rotating side plate 61.

Figure 12:
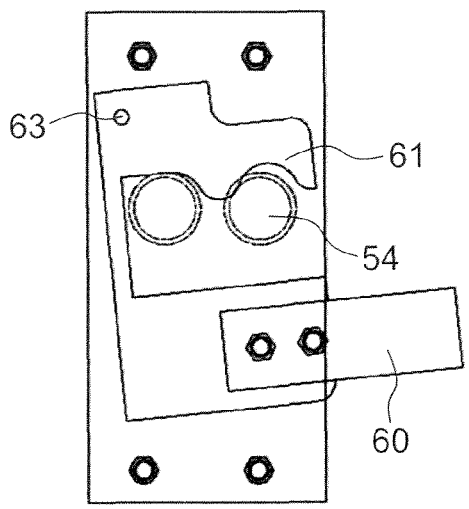
FIG. 12 is a schematic view showing the state where the edge of the rotating side plate is not caught into the groove of the register pin.
Figure 13:
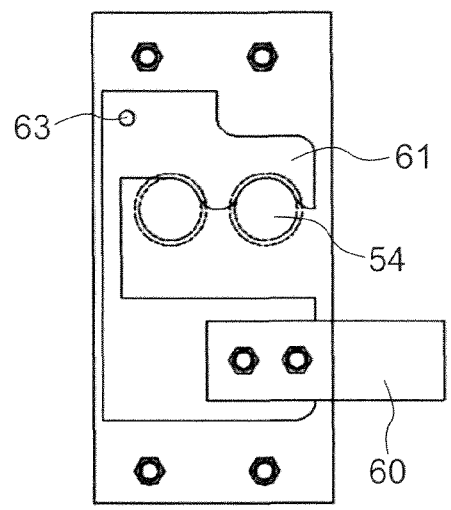
FIG. 13 is a schematic view showing the state where the edge of the rotating side plate is caught into the groove of the register pin when the rotating side plate is rotated to a certain position.
Figure 14:
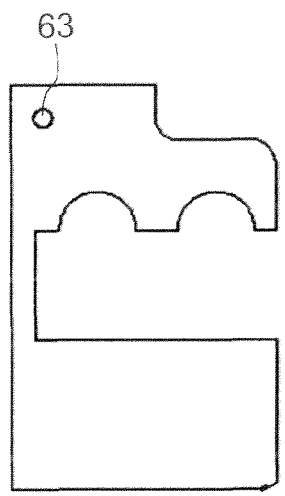
FIG. 14 is a structural schematic view of the rotating side plate.
Figure 15:
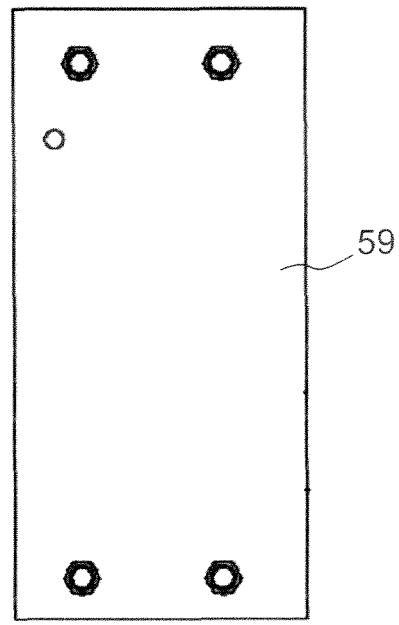
FIG. 15 is a structural schematic view of the fourth mounting plate.
Figure 16:
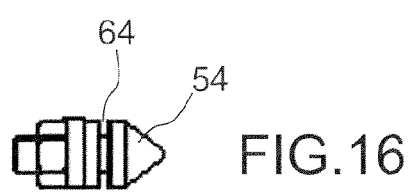
FIG. 16 is a structural schematic view of the register pin.

As shown in FIGS. 12 and 13 respectively, in the position shown in FIG. 12, the edge of the rotating side plate 61 is not caught into the groove 64 of the register pin 54, the first mounting plate 56 is not locked with the second mounting plate 57, and in the position shown in FIG. 13, the edge of the rotating side plate 61 is caught into the groove 64 of the register pin 54, and the first mounting plate 56 is locked with the second mounting plate 57, and due to the restriction by the groove of the register pin 54, the rotating side plate 61 cannot rotate downward any more, and the groove also restrict the forward and backward movement of the rotating side plate perpendicular to the paper surface, as is most clearly illustrated in FIG. 8, depending on such arrangement of the first mounting plate 56, the second mounting plate 57, the fourth mounting plate 59 and the rotating side plate 61, the rotating side plate 61 can fix and lock the first mounting plate 56 and the second mounting plate 59.

By designing the fourth mounting plate 59 and the rotating side plate 61 with such a configuration, the edge of the rotating side plate 61 may be caught into the groove 64 of the register pin 54 when the rotating side plate 51 is rotated, thus the first mounting plate 56 and the second mounting plate 57 are locked, and in such an assembly manner, it's possible to lock the first mounting plate 56 and the second mounting plate 57 without requiring any connecting manner, such as threaded connection, soldering and the like, allowing for simple assembly and disassembly manners, the rotating side plate 61 is only required to be rotated in opposite direction to unlock the relative fixation between the first mounting plate 56 and the second mounting plate 57. The knob 60 provided on the rotating side plate 61 makes it convenient for the user to rotate the rotating side plate 61, thus meeting the human engineering design.

Figure 17:
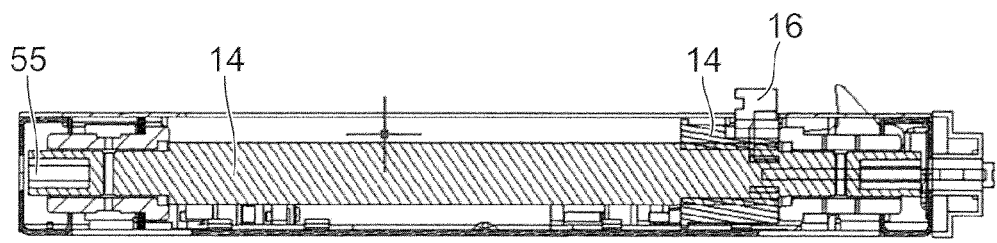
FIG. 17 is a structural schematic view of the drive lead screw.

FIG. 17 illustrates a structural schematic view of the lead screw 14; in this embodiment, the lead screw 14 is enclosed within housing, and the lead screw 14 is fixed above the third mounting plate 58 by this housing, so as to be positioned above the third mounting plate 58. The drive lead screw 14 drives the cart assembled on the cart assembly parts 16 through the drive block 15 mated with the drive lead screw 14, and here, the third mounting plate 59 is the base plate of the switch cabinet, that is, the lead screw 14 and the second mounting plate 57 are respectively mounted onto the inside and the outside of the base plate of the switch cabinet.

The rack in/out mechanism according to the present invention is especially suitable for a circuit breaker driven on a cart, and the cart contains by a drive block of the circuit breaker provided on the drive lead screw, the drive block transforms the rotary motion of the drive lead screw into linear motion.

Figure 18:
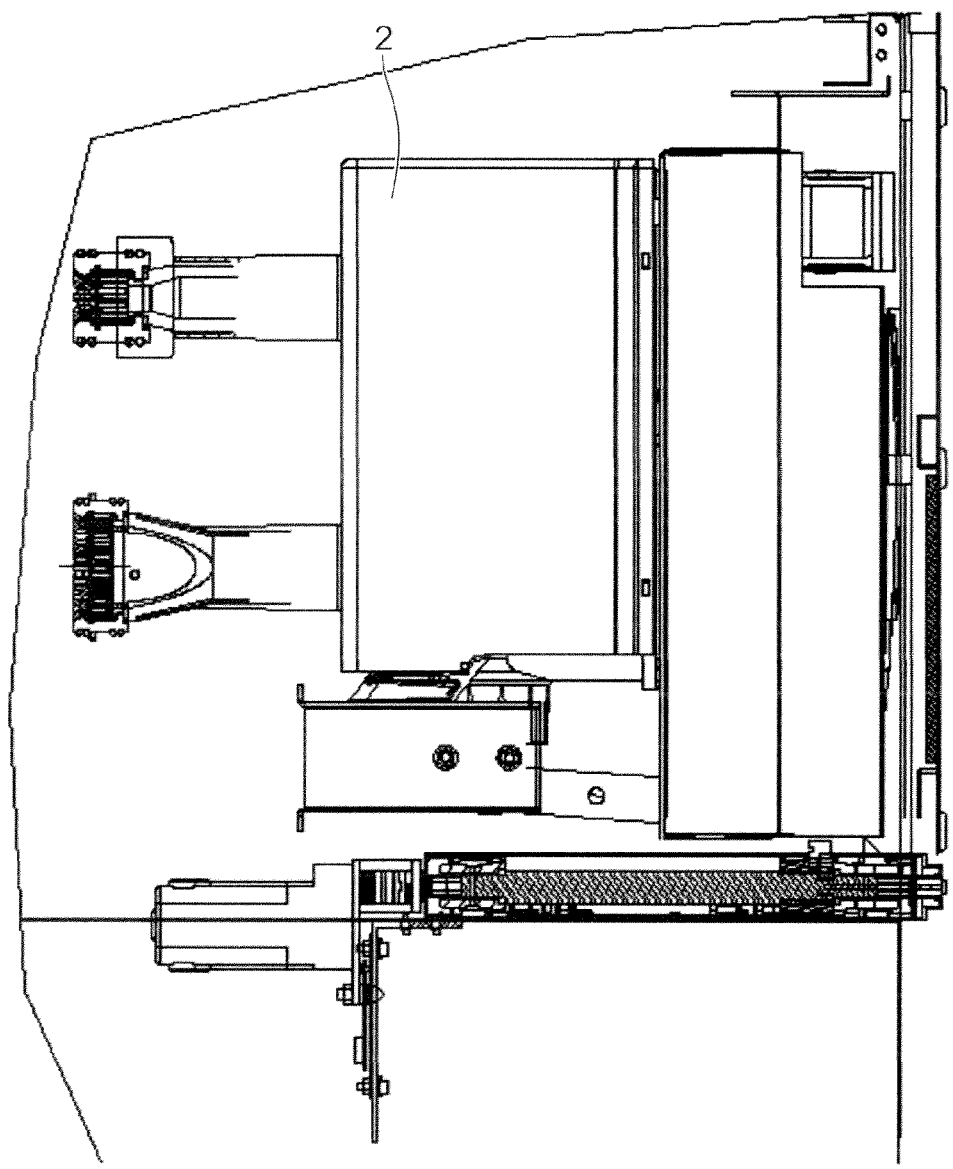
FIG. 18 is a structural schematic view showing the state in which the rack in/out mechanism according to the present invention is assembled into the switch cabinet.

FIG. 18 is a structural schematic view showing the state in which the rack in/out mechanism according to the present invention is assembled into the switch cabinet, where the circuit breaker 2 is illustrated.

The rack in/out mechanism is especially adapted to be used for the driving of the circuit breaker driven by the cart 1 within the switch cabinet, and overcomes the deficiencies in prior art that the electrical motor 12 of the cart 1 for driving the circuit breaker 2 is difficult to repair and has lower transmission efficiency. The method for assembling the rack in/out mechanism of the present invention is as follows: assembling first the electrical motor 12 and the retarding mechanism 52 together through the first mounting plate 56, assembling the lead screw 14 and the second mounting plate 57 onto the third mounting plate 58, assembling the fourth mounting plate 59 and the rotating side plate 61 together, then assembling the fourth mounting plate 59 and the second mounting plate 57 together, positioning the assembled electrical motor 12 and the retarding mechanism 52 by the cooperation between the register pin 54 and the pilot hole 68, directly jointing the output shaft 62 of the retarding mechanism 52 with the lead screw 14, then rotating the above-mentioned rotating side plate 61 to lock the first mounting plate 56 and the second mounting plate 57. By assembling the second mounting plate 57 and the third mounting plate 58 as well as assembling the second mounting plate 57 and the fourth mounting plate 59, which assembling are all achieved by threaded connection, the holes through which the bolts pass are aligned with each other by the above cooperation, thus it's possible to achieve positioning first the second mounting plate 57 on the third mounting plate 58 at appropriate position, and then positioning the fourth mounting plate 59 on the second mounting plate 57 at appropriate position, the third mounting plate 58 is commonly an unmovable plate, hence, by selecting the position of the holes through which the bolts pass, the second mounting plate 57 and the fourth mounting plate 59 may be well placed at desired positions, so as to eventually achieve the directly jointing of the output shaft of the retarding mechanism with the drive lead screw.

The rack in/out mechanism according to the present invention overcomes the weakness of the rack in/out mechanism in prior art that the electrical motor thereof is difficult to repair and replace, while providing higher transmission efficiency and lower manufacturing cost.

The above provides detail introduction of the present invention, and the variations made by the skilled in this art based on the idea of the embodiment of present invention about particular embodiments and the range of application should not be construed as departing from the protective scope of the present invention, generally speaking, the specific embodiments in this specification should not be regarded as limiting to the present invention.

What is claimed is:

1. A circuit breaker arrangement, comprising:
   a circuit breaker;
   a cart on which the circuit breaker slides, the cart comprising a lead screw and a circuit breaker drive block, said drive block being threaded on the lead screw and driving the circuit breaker;
   an electrical motor that rotates the lead screw;
   characterized in that the circuit breaker and/or the electrical motor are mounted on the cart through connections consisting of interlocked parts, a latch for engaging one of the interlocked parts and maintaining said interlocked parts in an interlocked state, and a mechanism for releasing the latch,
   wherein the interlocked parts comprise a protuberance on the drive block and an aperture in a floor of the circuit breaker, the protuberance entering the aperture in the interlocked state.

2. A circuit breaker arrangement according to claim 1, wherein the latch comprises static means provided on the cart for impeding a rotation of the drive block.

3. A circuit breaker arrangement according to claim 2, wherein the means for impeding a rotatic of the drive block comprises edges of an elongate slot parallel to the lead screw, said edges being adjacent to the protuberance, the elongate slot extending along a stroke of the drive block along the lead screw except at a disconnecting position for the circuit breaker.

4. A circuit breaker arrangement according to claim 1, wherein the mechanism for releasing the latch comprises means for rotating the drive block.

5. A circuit breaker arrangement according to claim 4, wherein the means for rotating the drive block comprises meshing reliefs provided on the drive block and on a support rotating with the lead screw.

6. A circuit breaker arrangement according to claim 5, wherein the means for rotating the drive block comprises a guiding sleeve slidably and rotatably retained in a plate of the cart, a spring for biasing the sleeve at a set angular position and at a distance of the support, and the guiding sleeve comprises meshing elements which mesh with the elements of the drive block and of the support.

7. A circuit breaker arrangement according to claim 1, wherein the cart comprises a front panel, which is provided with a handle inserting hole registering with a free end of the lead screw.

8. A circuit breaker arrangement, comprising:
   a circuit breaker;

a cart on which the circuit breaker slides, the cart comprising a lead screw and a circuit breaker drive block, said drive block being threaded on the lead screw and driving the circuit breaker;
an electrical motor that rotates the lead screw;
characterized in that the circuit breaker and/or the electrical motor are mounted on the cart through connections consisting of interlocked part, a latch for engaging one of the interlocked parts and maintaining said interlocked parts in an interlocked state, and a mechanism for releasing the latch,
wherein the interlocked parts comprise at least one pin and at least one mating pilot hole, the pin and the pilot hole being provided on a mounting first plate of the electric motor and on a second mounting plate provided on the cart.

9. A circuit breaker arrangement according to claim 8, wherein there are two pins and two mating pilot holes.

10. A circuit breaker arrangement according to claim 8, wherein the second mounting plate is elbow-shaped, and the lead screw is provided with a third mounting plate, the third mounting plate being fixed to an upper side of the second mounting plate and the first mounting plate standing opposite another, vertical side of the second mounting plate.

11. A circuit breaker arrangement according to claim 8, wherein the electrical motor is connected to the lead screw by a coupling comprising a key insertable into a key way.

12. A circuit breaker arrangement according to claim 11, wherein the electrical motor is also connected to the lead screw by a clutch.

13. A circuit breaker arrangement according to claim 8, wherein the latch comprises a mobile plate connected to a part in which the pilot holes are provided, and penetrating in grooves of the register pins.

14. A circuit breaker arrangement according to claim 13, wherein the mechanism for releasing the latch comprises a fourth mounting plate, and a pin provided on the fourth mounting plate and about which the mobile plate rotates.

\* \* \* \* \*